(12) United States Patent
Comperat et al.

(10) Patent No.: US 6,918,747 B2
(45) Date of Patent: Jul. 19, 2005

(54) METHOD AND SYSTEM FOR DETECTING DAMAGE TO THE ROTOR OF AN AIRCRAFT ENGINE

(75) Inventors: Patrick Comperat, Avon (FR); Philippe Even, Sainte Genevieve les Gasny (FR)

(73) Assignees: SNECMA Moteurs, Paris (FR); SNECMA Services, Paris (FR)

( * ) Notice: Subject to any disclaimer, the term of this patent is extended or adjusted under 35 U.S.C. 154(b) by 0 days.

(21) Appl. No.: 10/445,935

(22) Filed: May 28, 2003

(65) Prior Publication Data

US 2004/0060347 A1 Apr. 1, 2004

(30) Foreign Application Priority Data

May 28, 2002 (FR) ............................................ 02 06530

(51) Int. Cl.[7] .............................................. F01D 21/14
(52) U.S. Cl. .............................. 416/61; 415/1; 415/118
(58) Field of Search ................................. 416/61; 415/1, 415/17–18, 26–29, 118, 47–50; 702/183; 73/660

(56) References Cited

U.S. PATENT DOCUMENTS

| | | | | |
|---|---|---|---|---|
| 4,303,882 A | * | 12/1981 | Wolfinger | ................... 324/772 |
| 4,435,770 A | | 3/1984 | Shiohata et al. | |
| 4,453,407 A | | 6/1984 | Sato et al. | |
| 4,685,335 A | * | 8/1987 | Sato et al. | ..................... 73/660 |
| 4,955,269 A | * | 9/1990 | Kendig et al. | ................ 73/577 |
| 5,148,711 A | * | 9/1992 | Twerdochlib et al. | ......... 73/660 |
| 5,258,923 A | * | 11/1993 | Imam et al. | ................... 702/36 |
| 5,541,857 A | * | 7/1996 | Walter et al. | ............... 700/280 |
| 5,544,073 A | | 8/1996 | Piety et al. | |
| 5,686,669 A | * | 11/1997 | Hernandez et al. | ........... 73/660 |
| 5,744,723 A | * | 4/1998 | Piety | ........................... 73/660 |
| 6,098,022 A | | 8/2000 | Sonnichsen et al. | |
| 6,263,738 B1 | | 7/2001 | Hogle | |
| 6,321,602 B1 | | 11/2001 | Ben-Romdhane | |
| 6,445,995 B1 | * | 9/2002 | Mollmann | ................... 701/100 |

FOREIGN PATENT DOCUMENTS

EP   1 118 920 A1   7/2001

* cited by examiner

*Primary Examiner*—Edward K. Look
*Assistant Examiner*—Richard A Edgar
(74) *Attorney, Agent, or Firm*—Oblon, Spivak, McClelland, Maier & Neustadt, P.C.

(57) ABSTRACT

A method and system for detecting damage to the rotor of an aircraft engine using devices for measuring vibration and speed in order to acquire data relating to the speed of the rotor and also to the amplitude and the phase of rotor vibration during a determined flight. The method includes the following steps: reading the acquired data; calculating a mean vibration vector over a determined rotor speed range on the basis of the acquired data; calculating a vector difference between the mean vibration vector of the determined flight and the mean vibration vector of a reference flight for the rotor speed range; comparing the modulus of the vector difference with a predetermined threshold value; and issuing a warning signal when the modulus of the vector difference exceeds the predetermined threshold value, the steps being performed after the determined flight has been completed.

22 Claims, 9 Drawing Sheets

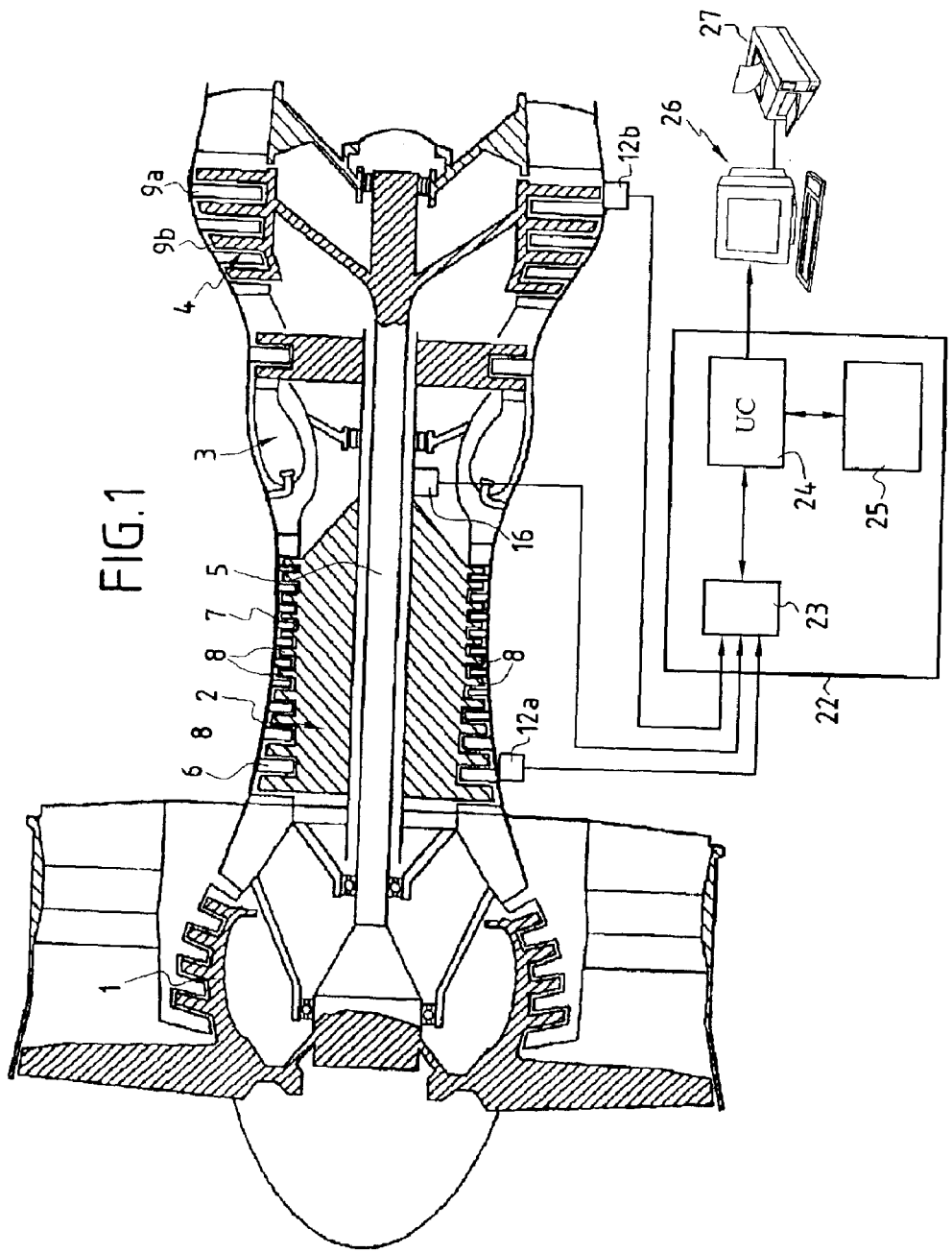

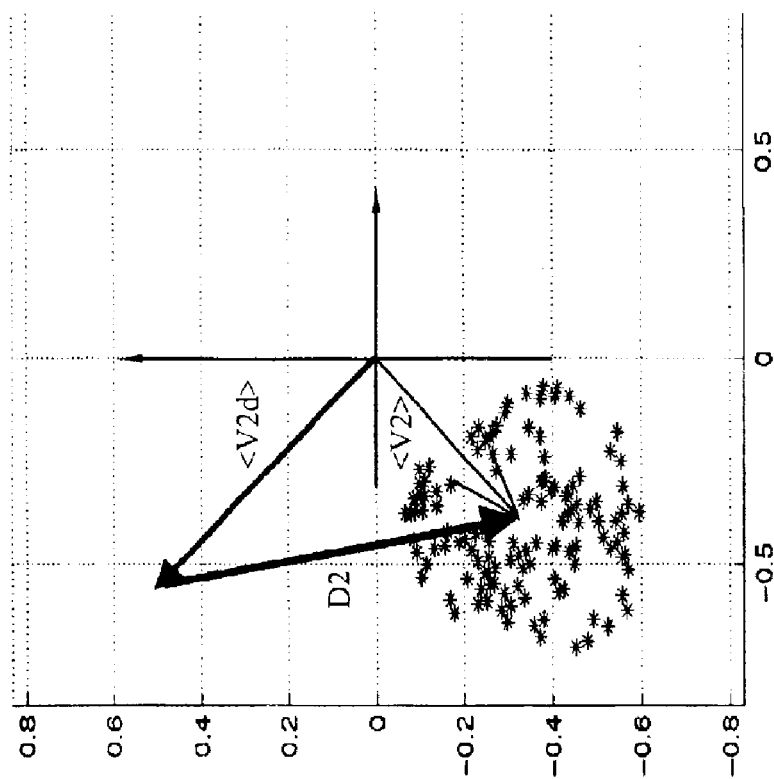
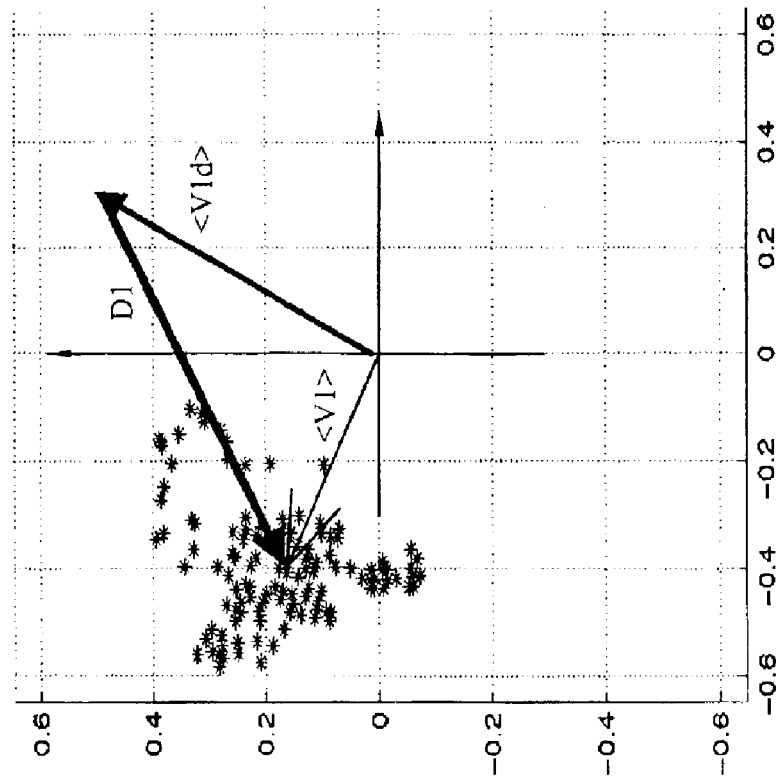
FIG. 7A
FIG. 7B

METHOD AND SYSTEM FOR DETECTING DAMAGE TO THE ROTOR OF AN AIRCRAFT ENGINE

BACKGROUND OF THE INVENTION

Field of the Invention

The invention relates to detecting damage to the rotor of an aircraft engine.

In civil aviation, regulations require aircraft engine vibration to be monitored. Such monitoring is generally performed by means of accelerometers.

The signal delivered by each accelerometer is initially processed in order to extract frequency components therefrom corresponding to the speeds of rotation of the rotors in the low pressure and high pressure stages. The amplitudes of these components are delivered in real time to the cockpit, and certain key values are stored for subsequent processing. In general, five to ten values are stored per flight, as measured under predefined stabilized conditions.

Unfortunately, it can happen that an aircraft engine rotor is damaged, for example by blades being torn off, without that event being detected because of the small amount of data gathered.

There thus exists at present a need for a system which enables damage to the rotor of an aircraft engine to be detected without error.

SUMMARY OF THE INVENTION

An object of the invention is to provide a method of detecting damage to the rotor of an aircraft engine in order to guarantee proper operation of the engine and safety of the aircraft.

Another object is to provide good diagnosis as soon as possible so as to have a maintenance team corresponding to the type of problem.

Yet another object is to provide preventative maintenance.

These objects are achieved by a method of detecting damage to the rotor of an aircraft engine including means for measuring vibration and speed in order to acquire data relating to rotor speed and to the amplitude and the phase of rotor vibrations during a determined flight, the method comprising the following steps:

reading said acquired data;

calculating a mean vibration vector over a determined rotor speed range on the basis of said acquired data;

for said rotor speed range, calculating a vector difference between the mean vibration vector of said determined flight and the mean vibration vector of a reference flight;

comparing the modulus of said vector difference with a predetermined threshold value; and issuing a warning signal when the modulus of said vector difference exceeds said predetermined threshold value, wherein the steps of reading the acquired data, calculating a mean vibration vector, calculating a vector difference, comparing, and issuing a warning signal are performed after said determined flight has been completed.

The detection method of the invention may also comprise the following steps:

for said rotor speed range, calculating a second vector difference between each vibration vector of said determined flight and the mean vibration vector of a reference flight;

calculating the modulus of said second vector difference associated with each vibration vector in order to select the maximum modulus;

comparing said maximum modulus with the predetermined threshold value; and issuing a warning signal when said maximum modulus exceeds the predetermined threshold value.

Similarly, the detection method of the invention may also comprise the following steps:

for said rotor speed range, calculating a third vector difference between each vibration vector of said determined flight and the mean vibration vector of said determined flight;

calculating a modulus for said third vector difference associated with each vibration vector in order to select a maximum modulus;

comparing said maximum modulus with the predetermined threshold value; and issuing a warning signal when said maximum modulus exceeds the predetermined threshold value.

According to a first particular feature of the invention, the reference flight corresponds to the flight preceding said determined flight.

According to a second particular feature of the invention, the reference flight corresponds to a flight associated with a standard, reference engine.

Advantageously, the method of the invention comprises a step of updating the mean vectors of the reference flight from the data of said determined flight whenever the modulus or the maximum modulus of the vector difference does not exceed the predetermined threshold value.

The amplitude of said determined rotor speed range corresponds to a value of 1% to 10% of the nominal speed of the rotor.

The threshold value is determined depending on the location of the vibration detection means and correspond to a value lying in the range 2 thousandths of an inch (mils) to 5 mils.

Another object of the invention is to provide a system for detecting damage to the rotor of an aircraft engine that enables the above-defined method to be implemented.

This object is achieved by means of a system for detecting damage to the rotor of an aircraft engine provided with vibration measurement means and speed measurement means for acquiring data relating to the speed of the rotor and also to the amplitude and the phase of rotor vibration during a determined flight, the system comprising:

means for reading said acquired data;

means for calculating vibration vectors as a function of rotor speed;

means for calculating a plurality of rotor speed ranges on the basis of said acquired data;

means for calculating a mean vibration vector over a determined rotor speed range on the basis of said acquired data;

means for calculating a vector difference between the mean vibration vector of said determined flight and the mean vibration vector of a reference flight for said rotor speed range;

means for comparing the modulus of said vector difference with a predetermined threshold value;

means for issuing a warning signal when said modulus of said vector difference exceeds said predetermined threshold value; and storage means for storing said data relating to the speed, the amplitude, and the phase of vibration of the rotor to enable them to be processed after said determined flight has been completed.

The detection system of the invention may also comprise:

means for calculating a second difference between each vibration vector of said determined flight and the mean vibration vector of a reference flight for said rotor speed range;

means for calculating a modulus for said second vector difference associated with each vibration vector and for selecting the maximum modulus;

means for comparing said maximum modulus with the predetermined threshold value; and means for issuing a warning signal when said maximum modulus exceeds the predetermined threshold value.

Similarly, the detection system of the invention may also comprise:

means for calculating a third vector difference between each vibration vector of said determined flight and the mean vibration vector of said determined flight for said rotor speed range;

means for calculating a modulus of said third vector difference associated with each vibration vector in order to select a maximum modulus;

means for comparing said maximum modulus with the predetermined threshold value; and means for issuing a warning signal when said maximum modulus exceeds the predetermined threshold value.

The detection system of the invention includes at least one means for measuring vibration in a radial plane of the engine.

The invention also provides an aircraft engine comprising a compressor fitted with first rotary disks and a turbine fitted with second rotary disks, the engine implementing the above-defined detection system.

In a preferred embodiment, the detection system comprises first vibration measurement means at one of the first rotary disks and second vibration measurement means at the second rotary disks.

The invention also provides a computer program designed to implement the above-defined method when executed by a computer.

BRIEF DESCRIPTION OF THE DRAWINGS

The invention will be better understood on reading the following description given by way of non-limiting indication, and with reference to the accompanying drawings, in which:

FIG. 1 is a view of an aircraft turbojet and includes a diagram of a system of the invention for detecting rotor damage;

FIGS. 7A and 7B show the vector differences between the mean vectors of a reference flight and the mean vectors of a determined flight in the method of FIG. 3;

DETAILED DESCRIPTION OF EMBODIMENTS

Figure 2A:
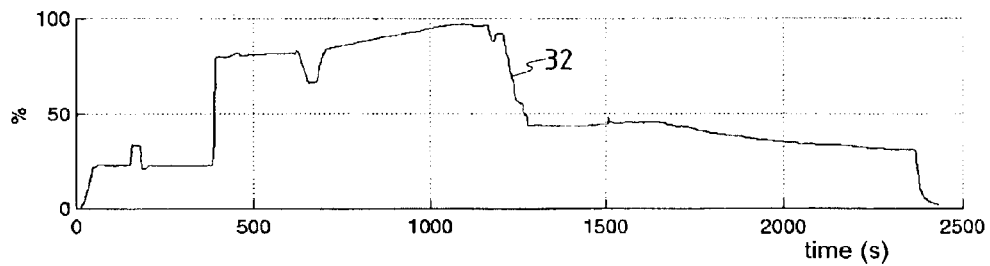
FIGS. 2A to 2C, show recordings of data relating respectively to speed, amplitude, and phase, and stored in flight by the memory unit of the invention.

FIG. 1 shows a portion of an aircraft engine, more particularly of a turbojet. The turbojet comprises a low pressure compressor 1 and a high pressure compressor 2 which supply a flow of compressed air to a combustion chamber 3 in order to ensure continuous combustion of fuel. The combustion products at high pressure and high temperature escape at high speed through a nozzle (not shown). The compressors are driven by a turbine 4 which extracts a fraction of the energy from the hot compressed combustion products and transforms it into mechanical energy.

Each compressor comprises a rotary portion or "rotor" 5 and a stationary portion or "stator" 6 together with a casing 7. The rotor comprises a drum made up by assembling a plurality of disks together, the disks having moving blades 8 fixed thereto. The stator is constituted by a plurality of rows of stationary blades which can be fixed to the casing 7.

The turbine 4 comprises one or more stages in which each stage is made up of a set of stationary blades 9a and a set of moving blades 9b fixed on a disk.

In operation, the various blades are subjected to aerodynamic forces. In addition, the moving blades 8 and 9b are subjected to centrifugal force which is proportional to the square of the speed of rotation. Thus, the blades and their attachment points to the disks are dimensioned for the most severe operating conditions.

Since blades are somewhat strip-shaped, they can vibrate at a resonant frequency which depends on their shape, their dimensions, and the way in which they are fixed to the disk.

Such vibration can be excited by the wake that starts from the trailing edges of the blades, by mechanical forces stemming from the rotor in the event of the rotor being excessively out of balance, or by aerodynamic instabilities. Consequently, the resulting sustained vibrations can cause one or more blades to break or be lost.

Thus, certain kinds of damage to the rotary parts lead to a sudden change in the balance of the corresponding rotor, and can consequently lead to vibration.

In general, engine vibration is monitored by accelerometers or other vibration sensors. Each sensor may comprise two accelerometers at an angle to each other in a radial plane of the engine, and preferably at 90°. The sensors may be placed on the casing 7 over the turbine 4, over one of the compressors 1 and 2, or between the compressors. Naturally, it is preferable for a vibration sensor to be placed facing the moving disk(s) that are to be monitored.

FIG. 1 shows diagrammatically both a first vibration sensor 12a level with the compressor 2, and a second vibration sensor 12b level with the turbine 4. The number of vibration sensors is arbitrary and their locations can be varied.

In conventional manner, each vibration sensor or each measurement means delivers an electrical signal representative of the mechanical vibration of the compressor or of the turbine. After being amplified and filtered, the signal is converted into digital data by an analog-to-digital converter in order to be analyzed digitally.

In addition, a speed sensor 16 measures the speed of rotation of the rotor associated with the compressor, and another speed sensor (not shown) also exists which measures the speed of rotation of the rotor associated with the turbine.

As shown very diagrammatically in FIG. 1, the damage detection system of the invention includes a data processor system 22 comprising in conventional manner an interface unit 23 which receives the digital data from the sensors and which transfers said data into a memory unit 25 to enable the data to be processed by a central processor unit 24. The processor system is also connected to a screen and/or a printer, located in the cockpit, for example.

Figure 2B:
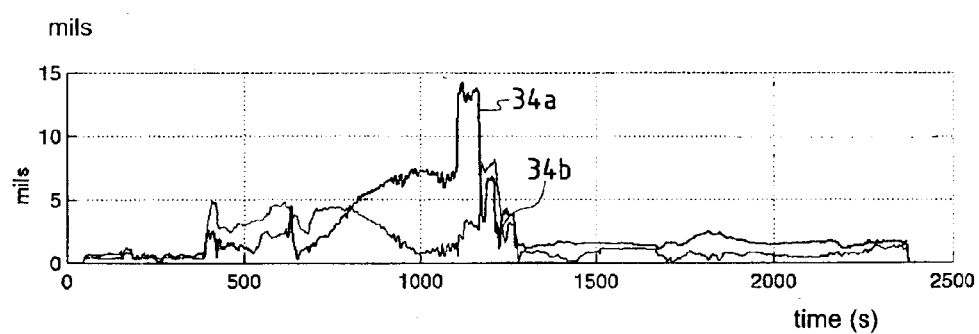
Figure 2C:
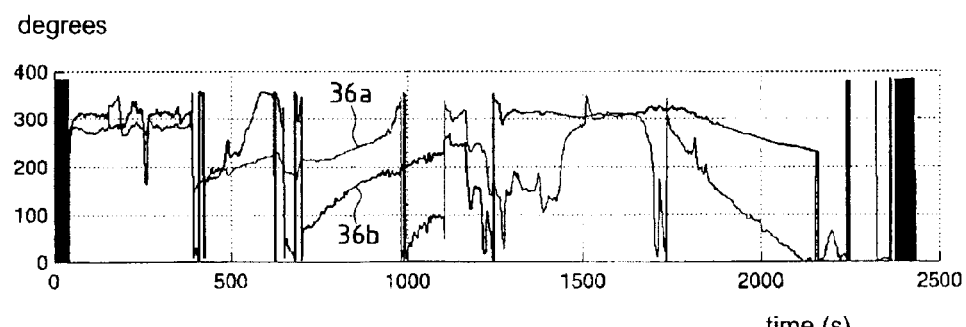

In accordance with the invention, FIGS. 2A to 2C show an example of a data recording stored in flight by the memory unit 25. Thus, the memory unit 25 constitutes storage means for storing data relating to the speed, the amplitude, and the phase of rotor vibration in order to process them after the flight.

The example of FIG. 2A is a plot 32 showing how the speed N(t) of the rotor varied as a function of time in seconds (s). In this example, speed is normalized relative to nominal speed and is given in the form of a percentage (%).

Vibration v(t) is characterized by its amplitude A(t), i.e. by a maximum departure from an equilibrium position, and by its phase $\phi(t)$. Amplitude thus has the dimension of a length which in this case is expressed in micrometers ($\mu$m) or in mils, and phase can be expressed in radians or in degrees (°). In general, vibration is expressed as a complex variable having modulus A(t) and argument $\phi(t)$ in radians, and of the form $v(t)=A(t)\exp(i\phi(t))$.

Thus, at any given instant, a vibration is defined by an amplitude and by a phase or angle. FIGS. 2B and 2C plot amplitude and phase respectively for the vibrations recorded during a determined flight.

FIG. 2B shows how the amplitude A(t) in mils varied as a function of time in seconds. A first curve 34a plots an amplitude A1(t) representing data measured by the first vibration sensor 12a. A second curve 34b plots amplitude A2(t) representing data measured by the second vibration sensor 12b.

FIG. 2C shows how phase $\phi(t)$ in degrees varied as a function of time in seconds. A first curve 36a plots a phase $\phi1(t)$ representing data measured by the first vibration sensor 12a. A second curve 36 plots a phase $\phi2(t)$ representing data measured by the second vibration sensor 12b.

By way of example, the acquisition rate of data in FIGS. 2A to 2C corresponds to one acquisition per second.

FIGS. 3 to 9B show the method of the invention for detecting damage to the rotor of an aircraft engine.

Figure 3:
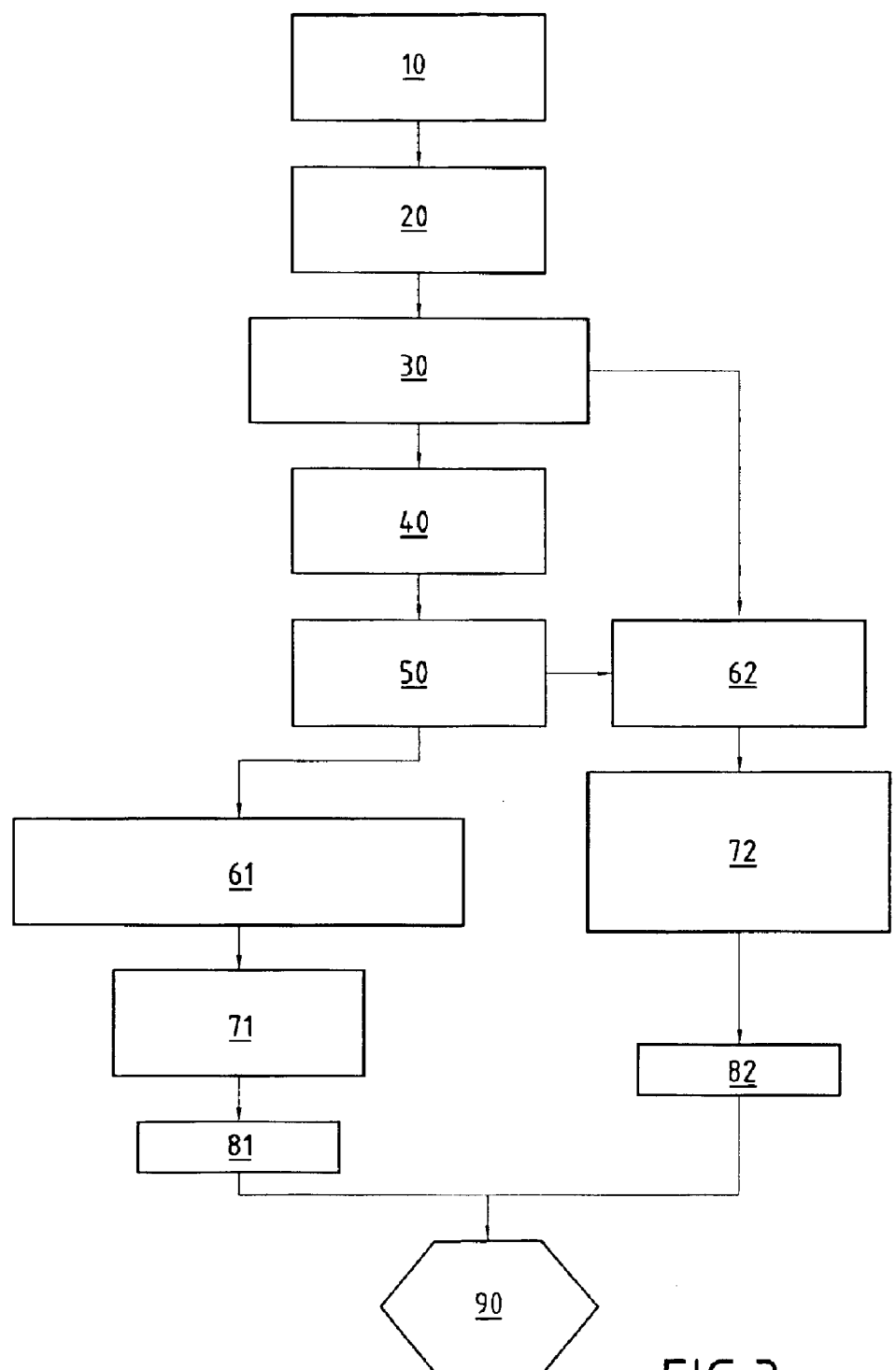
FIG. 3 is a flow chart showing the method of the invention for detecting damage to the rotor of an aircraft engine.

FIG. 3 is a flow chart illustrating this detection method after a determined flight. The process (see also FIG. 1) is implemented using programs stored in the memory 25 of the processing system 22. The process is started (step 10) by reading the data relating to the speed and the vibration of the rotor as stored in the memory 25 during the flight.

Thus, at the end of each flight, the central unit reads the data relating to the speed of rotation of the rotor (FIG. 2A), and to the amplitude and the phase of each vibration (FIGS. 2B and 2C) as acquired by the various measurement means.

In step 20, the vibration of the rotor at a given instant t is expressed by a vibration vector V defined by the amplitude A(t) and the phase $\phi(t)$ at said instant t of said vibration.

Figure 4:
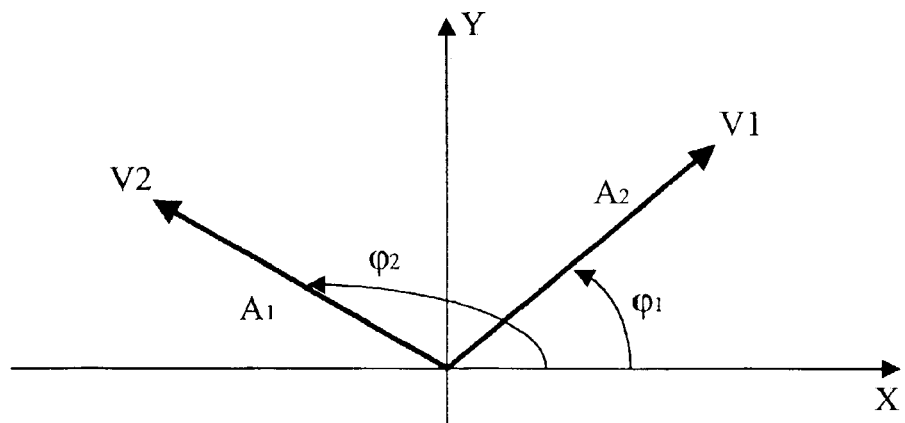
FIG. 4 is a diagram of vibration vectors in the method of FIG. 3.

FIG. 4 is a diagram showing vibration vectors V1 and V2 at a given instant, as picked up by the first and second sensors respectively, and plotted in polar coordinates. The lengths of the vectors V1 and V2 are proportional to their moduluses A1 and A2, and the angles they make with the main axis correspond to their phases $\phi1$ and $\phi2$ respectively.

In step 30 (see also FIG. 5), the vibration vectors coming from each vibration sensor are parameterized as a function of rotor speed. Thereafter, the spectrum of rotor speeds is subdivided into a plurality of speed "classes" or ranges, and consequently the vibration vectors are sorted in these ranges.

The subdivision need not necessarily be regular, and the amplitude of a speed range may correspond to a value of 1% to 10% of the nominal speed of the rotor. It is preferable to refine the subdivision at high speeds of the rotor since vibration, and consequently the risk of losing blades, is then higher. For example, for normalized rotor speeds of 80% to 110%, it may be appropriate to use subdivisions or ranges having an amplitude of 1%.

Furthermore, it is advantageous to enlarge the size of subdivision ranges at low speeds and even to eliminate the low end of the speed spectrum so as to avoid overloading data processing time and memory. For example, subdivisions can be made at 2% or more for normalized rotor speeds of less than 80%, and the portion below 20% can be eliminated.

Figure 5:
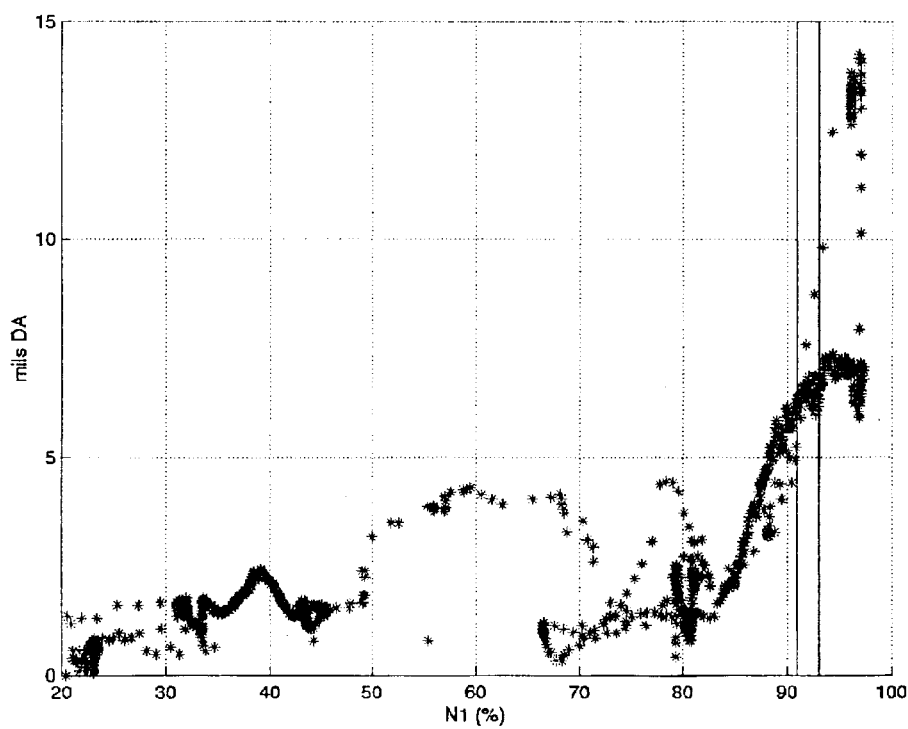
FIG. 5 plots the amplitudes of vibration vectors as a function of speed in the method of FIG. 3.

FIG. 5 shows an example of a distribution of spectral amplitudes (in mils) determined from one of the sensors and plotted as a function of the normalized speed of the rotor. In this example, the rotor speed spectrum is subdivided into ranges each having an amplitude of 2%, over an entire range of 20% to 100% of the nominal speed.

In step 40, the coordinates of a mean vibration vector <V> are calculated for each speed range and for each sensor.

Figure 6A:
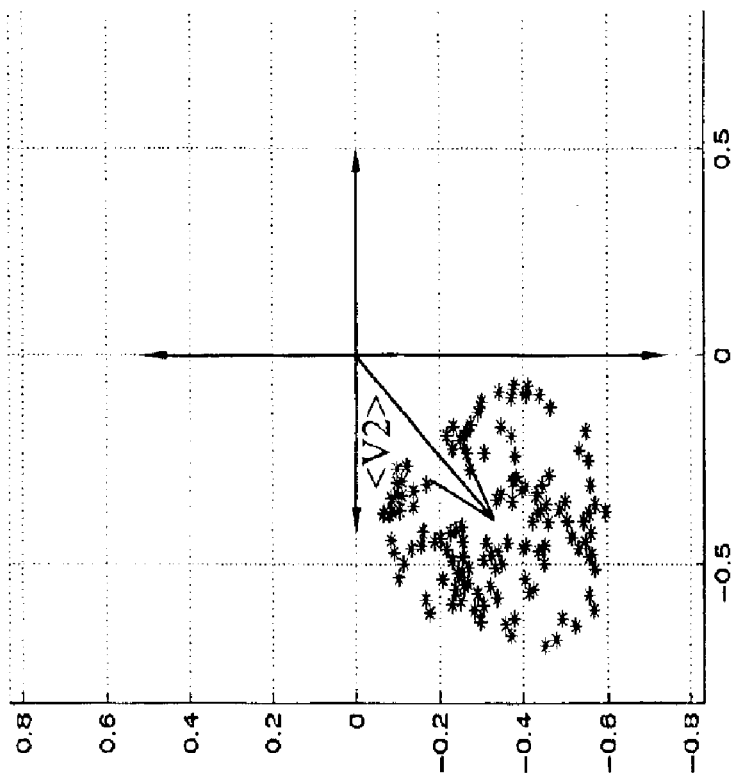
FIGS. 6A and 6B are scatter diagrams showing the Cartesian coordinates of vibration vectors and of their mean vectors, respectively, over a given speed range in the method of FIG. 3.

FIG. 6A is a scatter diagram showing a cluster of points representing the Cartesian coordinates of vibration vectors determined by the first sensor for a given speed range. In particular, this figure shows the vibration vectors for the speed range 80% to 82% of nominal speed. A vector average, defining a mean vector <V1> in the given range can be determined by computing the center of gravity of the cluster of points. It should be observed that if the number of points representing vector coordinates is small, it is preferable for better analysis to take no account of these points.

Figure 6B:
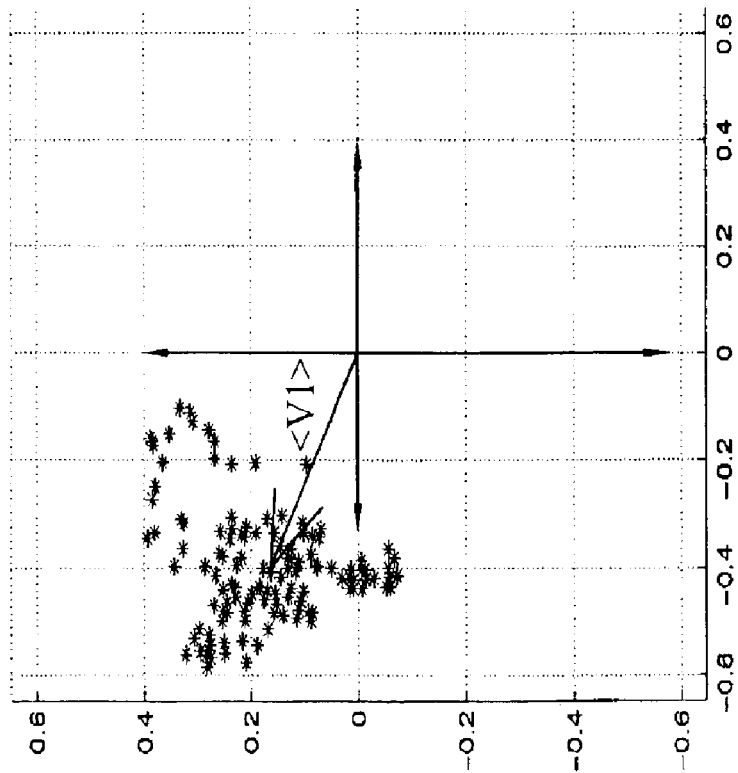

Similarly, FIG. 6B shows the Cartesian coordinates of vibration vectors determined from the second sensor together with their mean vector <V2> in a given speed range.

In step 50, the mean vector representing each speed range and each sensor is stored in memory.

Starting from step 50, the way these vectors vary is analyzed by steps 61 to 81 and/or by steps 62 to 82.

Thus, in step 61, for each speed range and for each sensor, the vector difference D is calculated between the mean vector <V1d> of a reference flight and the mean vector of the determined flight, naturally for the same speed range. It should be observed that the mean vectors <V1d> representing the various speed ranges of the reference flight have previously been stored in the memory 25 of the processor system 22 (see FIG. 1).

The reference flight may correspond to the flight preceding the determined flight. The reference flight may also correspond to a flight associated with a standard or reference engine, e.g. a test engine.

FIG. 7A shows the calculation of the vector difference D1 between the mean vector <V1d> of the reference flight, e.g. the preceding flight, and the mean vector <V1> of the determined flight, i.e. of the latest flight, on the basis of data stored in memory and relating to the first sensor. Similarly, FIG. 7B shows the calculated vector difference D2 relating to the second sensor.

When the vector difference as calculated in step 61 departs from a critical zone around the coordinates of the reference mean vector, then it can be diagnosed that the rotor has suffered damage, for example a broken blade.

Figure 8:
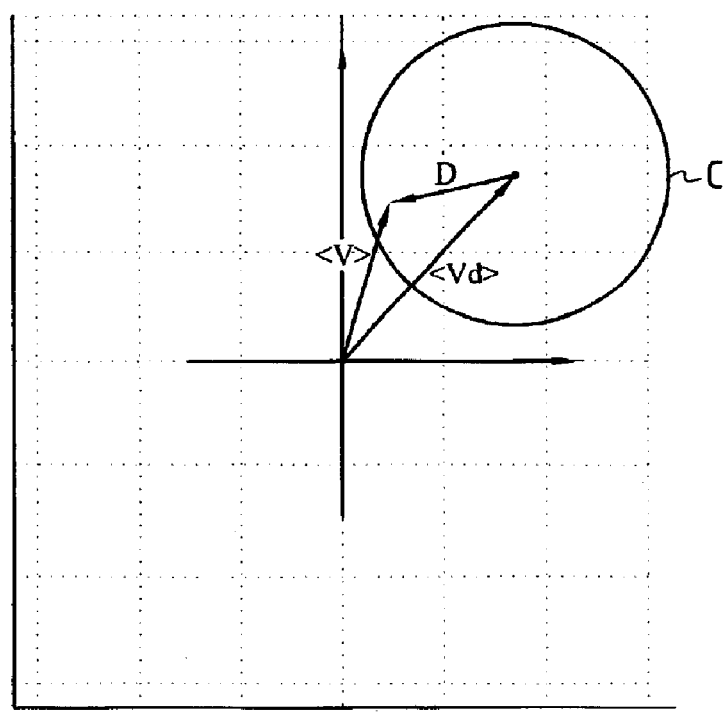
FIG. 8 shows a circle defining a threshold zone in the method of FIG. 3.
Figure 9A:
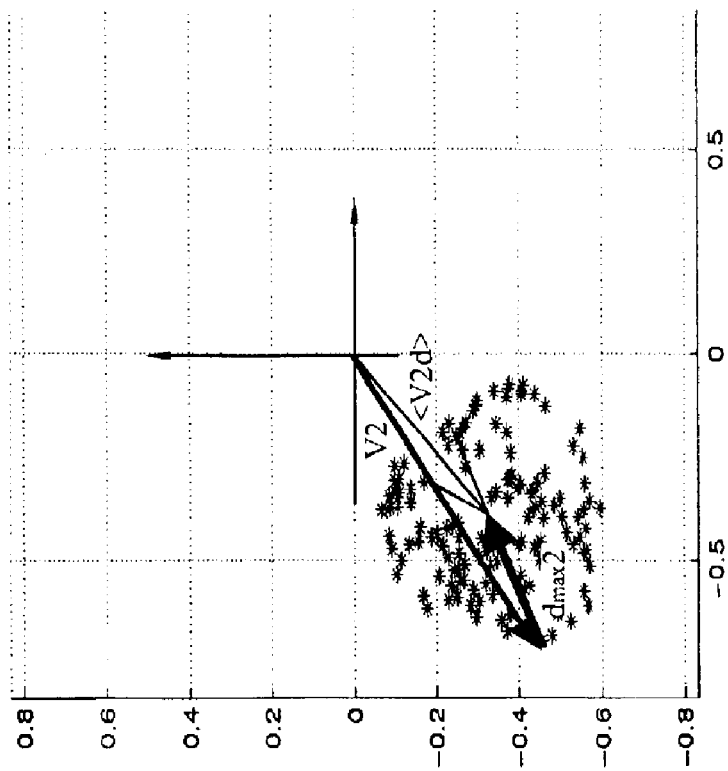
FIGS. 9A and 9B show vector differences between mean vectors of a reference flight and the vectors of a determined flight in the method of FIG. 3.
Figure 9B:
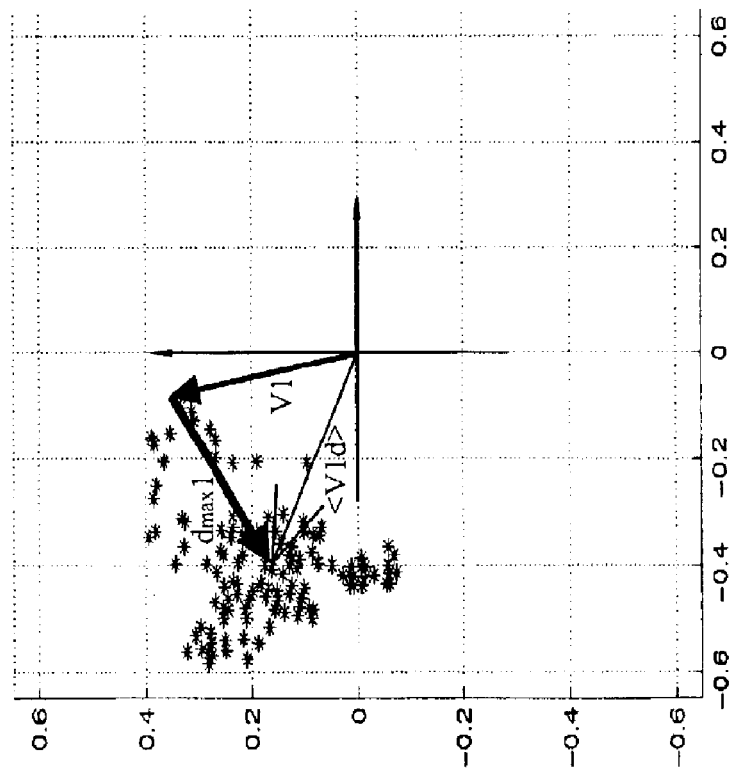

FIG. 8 shows a circle whose center has the coordinates of the reference mean vector <Vd> and whose radius has a value that is predetermined depending on the location of the detector. Thus, if the vector difference departs from the zone defined by the circle C, then it can be considered that the rotor has been damaged. In order to simplify the selection criterion, it is possible to calculate the modulus of the vector difference in order to compare it with a predetermined threshold value.

Thus, in step 71, the modulus d of each vector difference D is calculated, i.e. for each speed range. Thereafter, the values of these moduluses are stored in memory in step 81.

Subsequently, in step 90, the modulus d of the vector difference is compared with the predetermined threshold value. This threshold value may correspond to a value lying in the range 2 mils to 5 mils, for example.

The vibration sensor is more sensitive to the compressor being unbalanced than it is to the turbine being unbalanced. In addition, the sensitivity of the vibration sensors also depends on engine speed.

By way of example, the sensitivity of the sensor varies over the range about 200 centimeter grams per mil (cm.g/mil) to 300 cm.g/mil, i.e. an unbalance having a moment of about 200 cm.g corresponds to a vibration having an amplitude of 1 mil.

In general, a broken blade gives rise to an unbalance of about 2000 cm.g. Thus, given that there will normally be residual unbalance and given the differing sensitivities of the sensors, the rupture of a blade corresponds to a change in vibration amplitude of 2 mils to 5 mils. It should be observed that the range of variation for the threshold value may vary depending on the model of engine.

A process for calculating the statistical dispersion of vectors is described below with reference to steps 62 to 82. Thus, in step 62 (see also FIGS. 9A and 9B) the vector standard deviation of each vector is calculated as previously defined in step 30 over a determined speed range. Thus, in said speed range, the vector difference between each vibration vector D1 or D2 (as defined in step 30) of the determined flight and the mean vibration vector <V1d> or <V2d> (previously stored in memory) of a reference flight is calculated over a given range of rotor speeds.

It should be observed that it is also possible, in step 62, to calculate the vector difference between each vibration vector (as defined in step 30) of the determined flight and the mean vibration vector (stored in memory in step 50) of the determined flight for a given rotor speed range.

Then, in step 72, the modulus of the vector difference associated with each vibration vector is calculated and the maximum modulus dmax1 or dmax2 is determined. Thereafter, the maximum modulus, i.e. the largest modulus associated with the determined speed range is stored in the memory at step 82, or the larger modulus if there are only two of them.

Thereafter, in step 90, the maximum modulus for the determined speed range is compared with the predetermined threshold value.

When the maximum modulus (stored in memory in step 82) or a vector difference modulus (stored in memory in step 81) exceeds the predetermined threshold value, then a warning signal is issued on the cockpit screen or on a printer for the attention of maintenance personnel. The engine then needs to be examined appropriately before it is restarted.

In addition, when the modulus or the maximum modulus for the vector difference does not exceed the predetermined threshold value, the mean vectors of the reference flight are updated using the data from the determined flight so as to keep track of the normal aging of the engine.

It is also possible to envisage data relating to rotor speed and vibration being stored on a removable storage medium to enable the data to be processed by a computer on the ground after the aircraft has landed.

The method of detecting damage to a rotor in an aircraft engine comprising the above steps and implemented after a determined flight is particularly advantageous in that the pilot is not distracted by problems of this kind that are of little importance. Another advantage is the fact that the onboard processing system of the aircraft is not overloaded.

That said, it is entirely possible to detect rotor damage while in flight using a method similar to that of FIG. 3.

Figure 10:
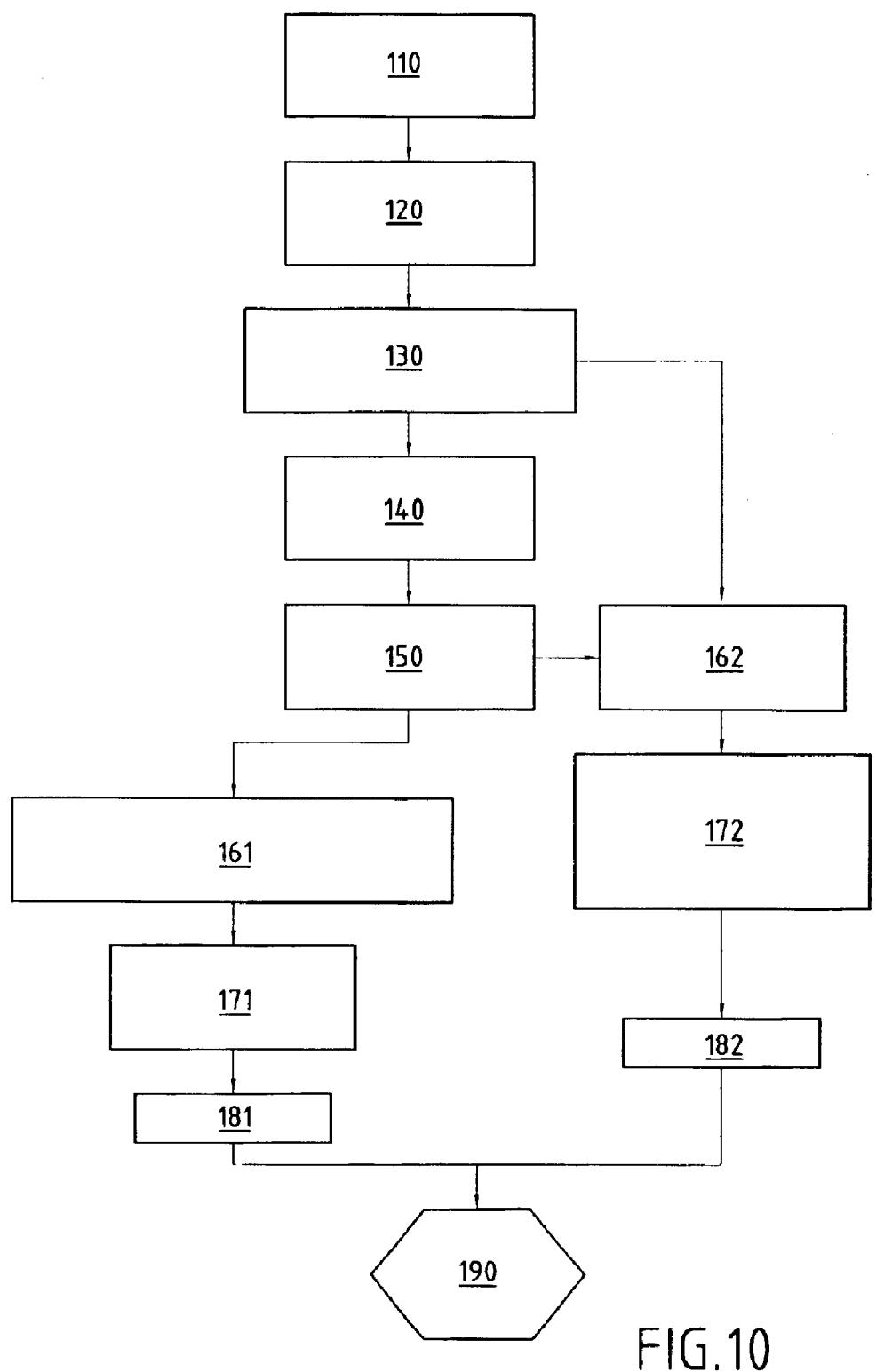
FIG. 10 is a flow chart showing the method of the invention for detecting damage to the rotor of an aircraft engine in flight.

The steps of the flow chart shown in FIG. 10 are similar to those of FIG. 3 except that the process begins with a step 110 in which data relating to the speed of the rotor and to the amplitude and the phase of rotor vibration is read in real time. In step 120, vibration is expressed by a vector which is defined relative to a determined range of rotor speeds (step 130). However, in step 140, the coordinates of a mean vibration vector for a determined speed range is calculated on the basis of partial data acquired in step 110. Thus, the mean vector can vary over the course of a flight by being enriched with subsequent data. In step 150, each calculated mean vector is stored in memory, possibly replacing the previously stored mean vector relating to the same speed range. All of the other steps are similar to those shown above in FIG. 3.

What is claimed is:

1. A method of detecting damage to the rotor of an aircraft engine including means for measuring vibration and speed in order to acquire data relating to rotor speed and to the amplitude and the phase of rotor vibrations during a determined flight, the method comprising the following steps:

reading said acquired data;

calculating a mean vibration vector over a determined rotor speed range on the basis of said acquired data, the determined rotor speed range corresponding to a value of 1 to 10% of a nominal speed of the rotor;

for said rotor speed range, calculating a vector difference between the mean vibration vector of said determined flight and the mean vibration vector of a reference flight;

comparing the modulus of said vector difference with a predetermined threshold value; and issuing a warning signal when the modulus of said vector difference exceeds said predetermined threshold value;

wherein said steps are performed after said determined flight has been completed.

2. A detection method according to claim 1, further comprising the following steps:

for said rotor speed range, calculating a second vector difference between each vibration vector of said determined flight and the mean vibration vector of a reference flight;

calculating the modulus of said second vector difference associated with each vibration vector in order to select the maximum modulus;

comparing said maximum modulus with the predetermined threshold value; and issuing a warning signal when said maximum modulus exceeds the predetermined threshold value.

3. A detection method according to claim 1, further comprising the following steps:

for said rotor speed range, calculating a third vector difference between each vibration vector of said determined flight and the mean vibration vector of said determined flight;

calculating a modulus for said third vector difference associated with each vibration vector in order to select a maximum modulus;

comparing said maximum modulus with the predetermined threshold value; and issuing a warning signal when said maximum modulus exceeds the predetermined threshold value.

4. A detection method according to claim 1, wherein the reference flight corresponds to the flight preceding said determined flight.

5. A detection method according to claim 1, wherein the reference flight corresponds to a flight associated with a standard, reference engine.

6. A detection method according to claim 1, further comprising a step of updating the mean vectors of the reference flight from the data of said determined flight whenever the modulus or the maximum modulus of the vector difference does not exceed the predetermined threshold value.

7. A detection method according to claim 1, wherein the threshold value is determined depending on the location of the vibration detection means and correspond to a value lying in the range 2 mils to 5 mils.

8. A computer program on a tangible computer readable medium, comprising: a first computer code configured to implement the method according to claim 1 when executed by a computer.

9. A system for detecting damage to the rotor of an aircraft engine provided with vibration measurement means and speed measurement means for acquiring data relating to the speed of the rotor and also to the amplitude and the phase of rotor vibration during a determined flight, the system comprising:

means for reading said acquired data;

means for calculating vibration vectors as a function of rotor speed;

means for calculating a plurality of rotor speed ranges on the basis of said acquired data;

means for calculating a mean vibration vector over a determined rotor speed range on the basis of said acquired data, the determined rotor speed range corresponding to a value of 1 to 10% of a nominal speed of the rotor;

means for calculating a vector difference between the mean vibration vector of said determined flight and the mean vibration vector of a reference flight for said rotor speed range;

means for comparing the modulus of said vector difference with a predetermined threshold value;

means for issuing a warning signal when said modulus of said vector difference exceeds said predetermined threshold value; and storage means for storing said data relating to the speed, the amplitude, and the phase of vibration of the rotor to enable them to be processed after said determined flight has been completed.

10. A detection system according to claim 9, further comprising:

means for calculating a second difference between each vibration vector of said determined flight and the mean vibration vector of a reference flight for said rotor speed range;

means for calculating a modulus for said second vector difference associated with each vibration vector and for selecting the maximum modulus;

means for comparing said maximum modulus with the predetermined threshold value; and means for issuing a warning signal when said maximum modulus exceeds the predetermined threshold value.

11. A detection system according to claim 9, further comprising:

means for calculating a third vector difference between each vibration vector of said determined flight and the mean vibration vector of said determined flight for said rotor speed range;

means for calculating a modulus of said third vector difference associated with each vibration vector in order to select a maximum modulus;

means for comparing said maximum modulus with the predetermined threshold value; and means for issuing a warning signal when said maximum modulus exceeds the predetermined threshold value.

12. A detection system according to claim 9, including at least one means for measuring vibration in a radial plane of the engine.

13. An aircraft engine comprising a compressor fitted with first rotary disks and a turbine fitted with second rotary disks, the engine including a detection system according to claim 9.

14. An aircraft engine according to claim 13, wherein the detection system comprises first vibration measurement means at one of the first rotary disks and second vibration measurement means at the second rotary disks.

15. A system for detecting damage to a rotor of an aircraft engine, comprising:

a vibration instrument configured to make a plurality of rotor vibration measurements during a flight of an airplane equipped with the aircraft engine, each measurement of the plurality of rotor vibration measurements comprising an amplitude and a phase;

a rotor speed instrument configured to make a plurality of rotor speed measurements; and a data processor unit configured to acquire the plurality of rotor vibration and rotor speed measurements from the respective vibration and rotor speed instruments, to calculate a plurality of rotor speed ranges, to calculate vibration vectors as a function of rotor speed and a mean vibration vector for each speed range of the plurality, to calculate, for each speed range of the plurality, a vector difference between the mean vibration vector calculated during the flight and a mean vibration vector of a reference flight, to compare a modulus of the vector difference with a predetermined threshold value, and to issue a warning signal when the modulus of the vector difference exceeds the predetermined threshold value.

16. The system according to claim 15, wherein the data processor system is further configured to store the rotor vibration and rotor speed measurements in a memory and to perform data processor system calculations after completion of the flight.

17. The system according to claim 15, wherein the rotor speed instrument further comprises:
   a first compressor rotor speed instrument; and
   a first turbine rotor speed instrument.

18. The system according to claim 15, wherein, for rotor speeds between 80 to 110% of the nominal speed of the rotor, the rotor speed ranges of the plurality correspond to a value of 1% of the nominal speed of the rotor.

19. The system according to claim 15, wherein rotor speed ranges for rotor speeds less than 80% of the nominal speed of the rotor correspond to 2% or more of the nominal speed and rotor speed ranges are not calculated for rotor speeds below 20% of the nominal speed of the rotor.

20. The system according to claim 15, wherein each rotor speed range of the plurality corresponds to a value of 1 to 10% of a nominal speed of the rotor.

21. The system according to claim 15, wherein the vibration vectors are parameterized as a function of rotor speed.

22. The system according to claim 15, wherein the speed ranges of the plurality are divided in non-regular subdivisions.

* * * * *